United States Patent [19]

Jandeska et al.

[11] 4,123,297
[45] Oct. 31, 1978

[54] FORMING CURVED THIN MAGNETS FROM RARE EARTH-TRANSITION METAL POWDERS

[75] Inventors: William F. Jandeska, Rochester; Charles F. Netherton, Marine City; Charles W. Vigor, Rochester, all of Mich.

[73] Assignee: General Motors Corporation, Detroit, Mich.

[21] Appl. No.: 820,600

[22] Filed: Aug. 1, 1977

Related U.S. Application Data

[63] Continuation-in-part of Ser. No. 779,525, Mar. 21, 1977.

[51] Int. Cl.$^2$ .............................................. H01F 7/02
[52] U.S. Cl. ..................................... 148/103; 29/608; 264/24; 335/302
[58] Field of Search ........................ 148/103; 335/302; 310/153; 29/608; 264/24

[56] References Cited

U.S. PATENT DOCUMENTS

| 3,663,317 | 5/1972 | Westendorp et al. | 29/608 |
| 4,010,434 | 3/1977 | Kools | 335/302 |

Primary Examiner—M. J. Andrews
Attorney, Agent, or Firm—George A. Grove

[57] ABSTRACT

In a preferred embodiment, thin curved rare earth-transition metal (RE-TM) compacts with good green strength are made by a stepwise process in the molding cavities of a portable compacting tooling. The powder is partially compacted and magnetically aligned in a first press equipped with magnetizing means. It is then transported in the tooling, which protects the powder from being disturbed during the transportation, to a second press where it is further compacted under much higher loads. The compacts thus formed can be further processed to form thin, curved, densified, permanent rare earth-cobalt magnets particularly suited for use as pole pieces in small, high-torque D.C. motors.

3 Claims, 3 Drawing Figures

U.S. Patent
Oct. 31, 1978
4,123,297
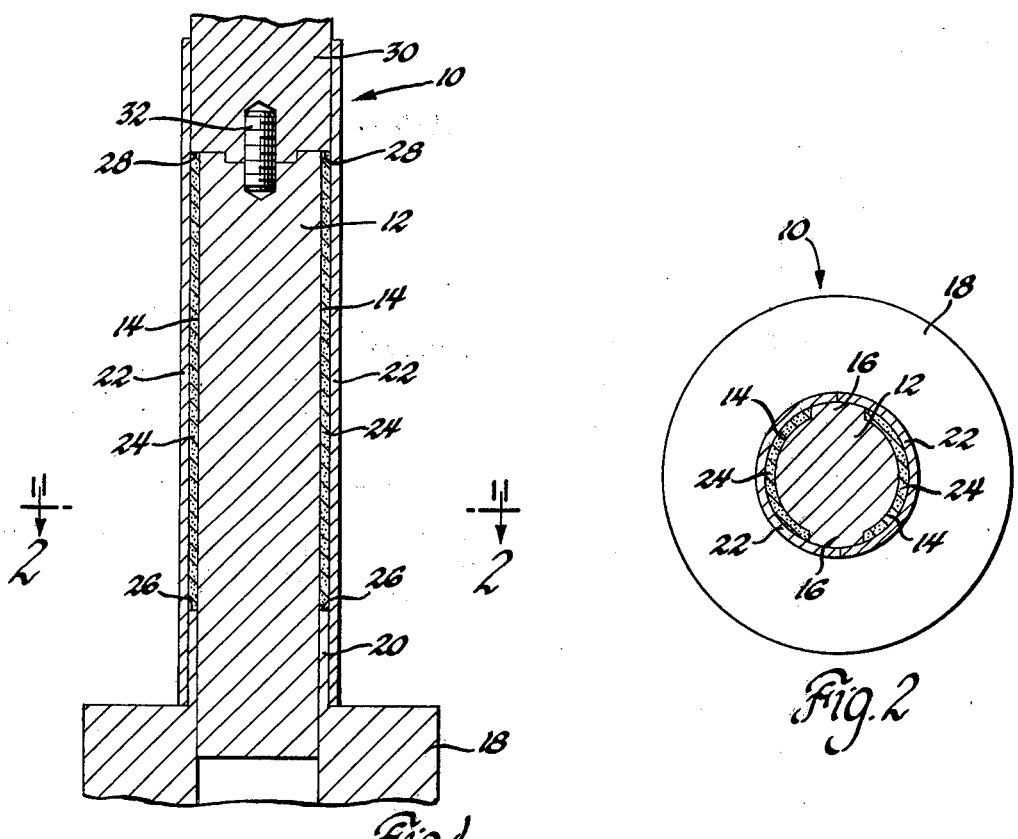
Fig.1
Fig.2
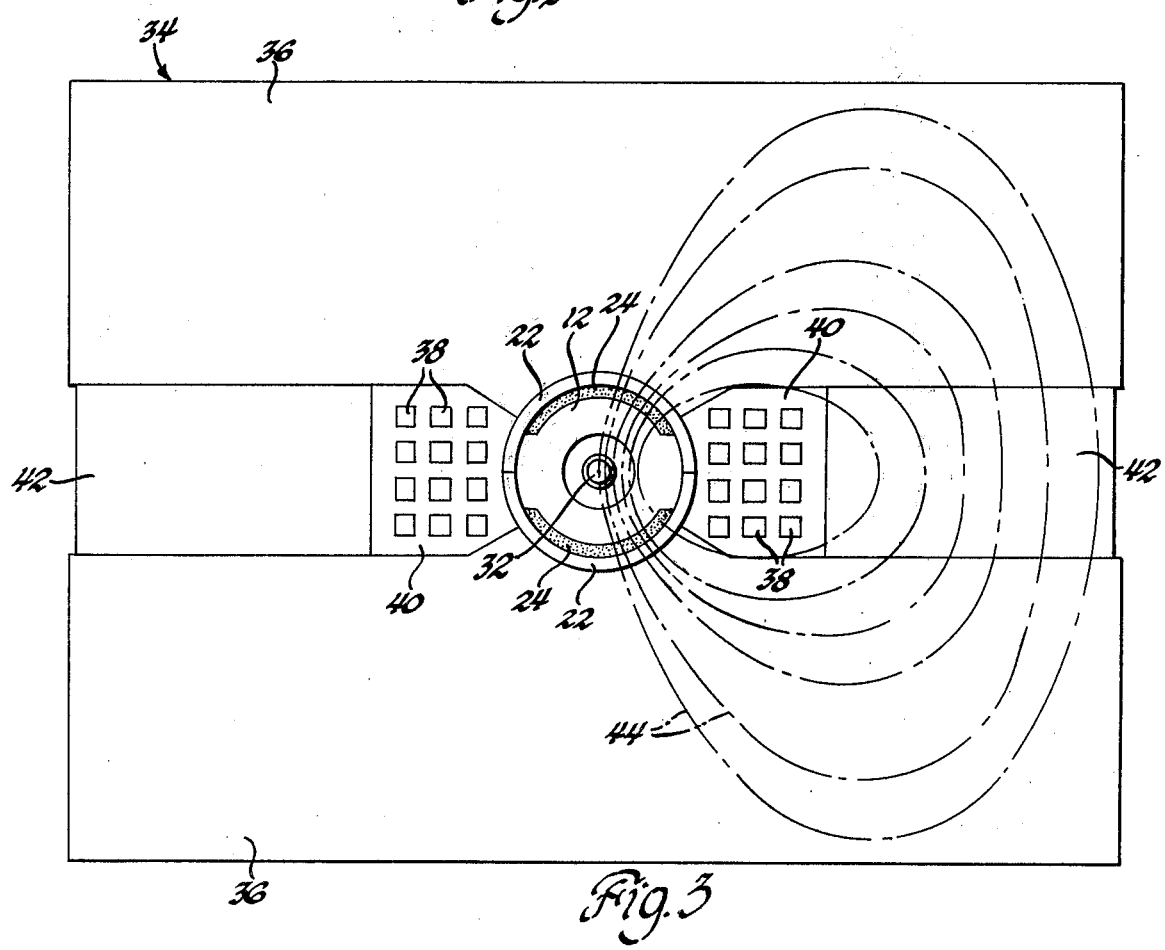
Fig.3

FORMING CURVED THIN MAGNETS FROM RARE EARTH-TRANSITION METAL POWDERS

This application is a Continuation-in-Part of our copending application Ser. No. 779,525, filed Mar. 21, 1977.

This invention relates to a practical method of making self-sustaining thin, curved compacts from magnetically aligned rare earth-transition metal (RE-TM) powder by forming the compacts in a specially designed tooling. Moreover, it relates to a method for making green RE-TM powder compacts strong enough to be easily removed from compacting tooling and sintered or otherwise processed to form densified permanent RE-TM magnets. Since RE-TM magnets have excellent magnetic properties, thin, curved magnets made from such compositions are particularly useful in applications where magnet size, weight, and magnetic strength are factors. We teach in the above copending application, that long, thin, curved RE-TM powder compacts can be sintered onto the motor casings of small sized, high-torque D.C. motors by hot isostatic compaction. A motor with integral thin, curved RE-TM magnet pole pieces has particular utility in a limited space application such as a window lift for a thin car door where a wire wound iron magnet motor would not fit.

Before this invention it was conventional to make thin, curved RE-TM magnets by grinding flat sintered powder magnets into suitable shapes. Grinding is wasteful of the RE-TM powders and prohibitively expensive by industrial production standards. It would be more convenient and less costly to make thin, curved RE-TM magnets directly by powder metallurgy techniques, but the physical characteristics of RE-TM powders make them difficult to compact and magnetically align in such configurations in standard equipment.

RE-TM compositions are a family of materials with superior magnetic properties containing one or more of the rare earth metals combined in suitable proportions with one or more of the magnetic transition metals such as iron, nickel or cobalt. Their powders are extremely hard (approximately Rockwell C-53 in the case of $SmCo_5$) and have low compressibility so it is difficult to generate sufficient powder motion in a die during compaction to form green compacts having uniform powder densities and sufficient green handling strengths. Thin, flat green compacts have been made by pressing RE-TM powder in a direction normal to the flat surface, however, production of thin, curved compacts by pressing them radially in curved dies has not been successful at comparable compaction loads. We have found that if compaction loads high enough to produce compacts with uniform density and sufficient handling strength are applied with a curved die, elastic recovery in the die itself fractures the thin, curved compacts on ejection.

An alternative approach to making such RE-TM powder compacts is to compress the powder in a direction parallel to the axis of curvature of the curved surface of a compact. In axial compaction, high unit loads, i.e., about 1375 MPa, are required to obtain uniform pack density along the axial length of a relatively long, thin compact. However, at die loads greater than about 680 MPa the powder tends to bind into conventional compaction dies, damaging the tools and requiring compact ejection loads exceeding the green strength of the compacts. The dies could be formed of very hard materials to reduce tool damage, but such dies cannot easily accommodate magnetizing means positioned closed enough to the powder to align it and still tolerate the very high die loads necessary to form coherent green compacts. Because these compacts are so difficult to form it has been impractical to produce thin, curved RE-TM metal magnets on a commercial basis.

It is an object of this invention to provide an improved method, including tooling, for handling, magnetically aligning, and compacting rare earth-transition metal powder into thin, curved green compacts at a practical rate and without undue breakage.

It is a more specific object of the present invention to provide a procedure and tooling for effectively forming fragile, thin, curved green compacts from RE-TM powder. The procedure and tooling permit the powder to be simultaneously magnetically aligned and initially compacted in a first press to a density at which the alignment of the particles is fixed when the magnetic field is removed. The procedure and tooling further permit the compacted powder to be transported to a second press in which it is consolidated at a very high compaction force into a green compact that is self-sustaining when later sintered or otherwise densified into a completed thin, curved permanent magnet.

In accordance with a preferred embodiment of our invention these and other objects and advantages are obtained as follows. RE-TM powder is introduced into a thin, curved cavity in the shape of the desired green compact formed between a mandrel shaped to define the inner curved surface of the compact and a die liner shaped to define its outer curved surface. A die punch may be inserted at the bottom end of the cavity to keep the powder from flowing out. The mandrel and die liner (and punch) serve as at least part of a portable tooling in which the powder is handled and processed as it undergoes the transition from a loose powder to a useful, thin, curved compact suitable for final densification into a strong permanent magnet.

In order to make a green RE-TM powder compact suitable for further processing into a densified permanent RE-TM magnet, the powder therein is magnetically aligned in a preferred magnetic orientation before it is finally densified. Therefore, a first press is employed, equipped with means for accommodating the tooling and magnetically aligning the RE-TM powder in the cavity. The tooling is positioned in this press and the powder therein is simultaneously compacted in an axial direction with respect to the curvature of the cavity and magnetically aligned by a magnetic field generated by the magnetizing means in the press. The powder is compacted to a bulk density of at least 50% of the density of the material, so as to fix the magnetic alignment of the particles so that it is not substantially changed when the magnetical field is removed, when the powder is further pressed to higher densities without an applied magnetic field, or when the compact is finally densified by means such as sintering or hot isostatic compaction.

The partially compacted and magnetically aligned powder body is then removed from the first press and transported in the tooling to a second press for further compaction. The die liners protect the aligned and lightly compacted powder from being disturbed during the transportation. This press is not equipped with magnetizing means and may be constructed so that the powder can be compacted at much higher die loads without damaging the tooling or the powder compacts therein. The tooling is positioned in the die blocks of the second press and the powder is further axially pressed under high compaction forces to a self-supporting green compact which can be easily removed from the compacting tooling without breaking.

Our invention will be better understood in view of a detailed description which follows. Reference will be made to the drawings in which:

FIG. 1 depicts an elevation in cross-section of a compacting tooling for axially compressing RE-TM powders into curved wafer-thin shapes in accordance with the subject process;

FIG. 2 is a sectional view of the tooling of FIG. 1 along line 2—2; and

FIG. 3 is a plan view in section showing the compacting tooling positioned in a compacting and magnetizing apparatus with flux lines generated by the coils shown.

We have discovered a method of making green RE-TM powder compacts in thin, curved shapes wherein the powder is axially compressed and magnetically aligned in a low cost portable compacting tooling. Each element of the tooling is designed not only to withstand high compaction forces but also to facilitate powder filling and magnetic alignment, and to permit removal of the compact from the tooling. Moreover, die wear and compact breakage are minimized by our method.

In a preferred embodiment and referring to FIGS. 1 and 2, a compacting tooling 10 is provided. A ferromagnetic mandrel 12 is employed having opposing surface segments 14 defining the circular arcs of the inside curved surface of the green RE-TM powder compacts to be formed. Since it is preferred to have symmetric die loads on the mandrel 12 during compaction, two identical compacts are formed at a time. The mandrel 12 is provided with opposing ribs 16 to separate the compacts. The mandrel 12 is slidably retained in a tightly fitting annular restraint ring 18. Ring 18 has an upper annular shoulder 20 to provide a well defined bottom edge on the compacts. Thin, semicircular nitrided steel die liners 22 enclose the mandrel 12 as seen in FIG. 2 and defined two long, thin, curved cavities 24 (shown filled with RE-Co powder) between themselves and surfaces 14. The bottom 26 of the cavities 24 is defined by shoulder 20. When the tooling is placed in a suitable press, the upper boundary 28 of the cavities 24 is then defined by a press punch 30 which is adapted to be slidable in liners 22 and bear down on mandrel 12 and the powder in the cavities 24. Optionally, a coupling member 32 can be used to position the punch 30 over the mandrel 12 in the tooling 10. The assembly of die liners 22, mandrel 12, restraint ring 18, punch 30 and coupling member 32 can be transported as a unit during compact fabrication.

FIG. 3 shows a plan sectional view of the die block of a press 34 suitable to initially compact and simultaneously magnetically align the RE-TM powders contained in the tooling cavities 24. The die is comprised of soft iron die blocks 36 between which magnetizing coils 38 are retained in coil cavities 40. Iron spacers 42 separate die blocks 36. When a current is caused to flow through the magnetizing coils 38, a magnetic field, represented by field lines 44, is generated. Each RE-TM powder particle acts as an elementary magnet in the presence of the applied field and aligns itself along the field lines in a direction that is substantially coincident with a radius of the arc. The tooling is positioned in the press so that the field lines intersect the entire arc of each cavity so all the powder will be magnetically aligned. The die liner 22 is chosen to be sufficiently thin so as not to substantially interfere with the desired direction of the magnetic field.

In accordance with the practice of our invention, RE-TM powder is magnetically aligned and compacted in a first press to a density sufficient to stabilize its magnetic alignment. The first press is equipped with any suitable magnetizing means well known to the art such as the magnetizing coils shown in FIG. 3 or magnetically soft pole pieces fitted in a solid nonmagnetic die block. A magnetic aligning field can be generated in such pole pieces by field generating means remote from the press. Generally, these means are located as close as possible to the powder to assure maximum field strength for magnetic alignment. FIG. 3 shows a preferred press embodiment for the practice of our invention wherein the magnetizing coils 38 are located close to the tooling die liner 22. Although the relatively soft iron die blocks and die liner can tolerate the low compacting forces (about 21 MPa) necessary to stabilize the magnetic alignment of the powder (about 50% density), they cannot support the high compacting forces necessary to further axially press the powder into self-sustaining green compacts. If such forces were applied, the tooling would be deformed and the press dies and magnetizing means could be damaged. An advantage of our invention is that it provides a means for moving partially compacted and magnetically aligned powder from a first press to a second press where higher compacting loads can be applied and tolerated by the dies. Because the magnetic alignment of the powder is fixed in the initial compacting in the first press, the second press does not have to be equipped with magnetizing means. Such a high compression press is generally equipped with hardened tool steel die blocks into which the tooling of invention can be incorporated.

Thin, curved, green rare earth-transition metal powder compacts were made in accordance with the preferred practice of our invention as follows. Equal weights of $SmCo_5$ powder were poured into each of the two opposing cavities of a tooling like that shown in the drawing. The cavities were of a size to form two identical self-sustaining green powder compacts 5.6 cm long and 1 mm thick with an inner radius of 2.6 cm and an arc length of 114° each. The tooling was vibrated as the powder was poured into the cavities to assist its downward flow. The die liners were made from split, AISI 1018 steel tube one mm thick which was nitrided to resist wear and then honed to the desired dimensions. The mandrel was made of a ferromagnetic die steel to be able to withstand the high compaction forces used in the second press to further axially press the powder into self-sustaining green compacts.

The tooling was then placed in the die block of a first press having a configuration similar to that shown in FIG. 3 for initial compaction and magnetic alignment of the powder. A current was introduced through the magnetizing coils to create a strong magnetic field of about 20,000 Gauss across the tooling assembly as illustrated by the field lines 44 in FIG. 3. Simultaneously, the powder was compacted in the cavities between a punch and a restraining ring to a density of about 50% of the theoretical with an axial compaction force of about 21 MPa. The compaction force is in the direction of the longitudinal axis of the curved powder cavities (i.e., perpendicular to the radii of the cavities). The powder particles behave as elementary magnets in the presence of the induced magnetic field and align themselves to a high degree radially across the arcuate cavities in the tooling. At 50% density, the powder particles become interlocked preventing further particle rotation. Thus, the powder can be further compacted without an applied magnetic field without disturbing its magnetic alignment.

The assembly is removed from the magnetizing fixture and placed in the split die block of a high compression hydraulic press. The powder is further axially compacted with a die force of about 1400 MPa to a pack density of about 70% of the theoretical. There was substantially no decrease in the magnetic alignment of the powder with this further compaction. This press is equipped with a hard tool steel die block which serves to reinforce the nitrided steel die liner so that it can sustain the high compaction forces necessary to compact the powders to 70% density without distorting. The die is then split and the tooling removed from the press. The split die liner is simply removed from the tooling exposing the magnetized green $SmCo_5$ compacts which are then slid off the mandrel. Although these compacts are fragile, they are self-sustaining and can be easily removed from the mandrel (to which they are strongly magnetically attracted) without breaking.

To form a densified permanent $SmCo_5$ magnet, these compacts can be sintered into densified magnets by well known techniques or densified by hot isostatic compaction as taught in our copending application. Magnets densified from compacts made according to our method have good magnetic properties because the powder particles therein are uniformly magnetically aligned in a preferred orientation.

Our method has been illustrated in terms of using samarium-cobalt powder to make the permanent magnets. This is a preferred embodiment but other rare earth-cobalt compositions including any of the following are similarly useful: yttrium, lanthanum, cerium, praseodymium, neodymium, promethium, europium, gadolinium, terbium, dysprosium, holmium, erbium, thulium, ytterbium, and lutetium. The rare earth constituent may also be in the form of misch metals, naturally occurring compositions. An exemplary misch metal is cerium misch metal which typically comprises by weight about 53% cerium, 24% lanthanum, 5% praseodymium, 16% neodymium, and 2% other rare earths. Moreover, as is known in the art, small percentages of elements such as copper or aluminum may be added to the RE-TM compositions to improve the coercivity of the magnets.

The compacting tooling arrangement of this invention is particularly suited for axially compacting RE-TM powders at high forces between the thin, curved ends of the die cavities. The slidable mandrel serves to distribute the compacting force over the whole working surface area of the punch reducing the tendency of the punch to gall or warp in production. Therefore, high compaction forces needed to form self-sustaining green compacts (greater than 60% theoretical density) can be applied without damaging the tools.

Although green compacts can be magnetically aligned in the same direction as they are compacted, it is preferable that they be aligned radially, i.e., in a direction perpendicular to the compacting direction. Commercial magnet producers have reported a 10 to 15% improvement in magnetic flux when powder pressing is done perpendicular to the magnetic alignment direction of $SmCo_5$ powder. (Hitachi Magnets Corporation, Permanent Magnet Motor Seminar, Jan. 20-21, 1976, Grand Rapids, Mich.)

Among its many advantages, our method provides for the easy handling of extremely brittle and hard to compact rare earth-cobalt powders. Moreover, RE-TM powders are protected during compaction in our portable compacting tooling so they can be transferred between high and low compression presses without being disturbed. Strong green powder RE-TM compacts are easily made which can be densified to form thin, curved permanent RE-TM magnets, eliminating the necessity for diamond grinding flat RE-TM magnets and minimizing waste of expensive rare earth-cobalt powders.

While our invention has been disclosed in terms of specific embodiments, it will be appreciated that other forms could readily be adapted by one skilled in the art. Accordingly, the scope of our invention is to be considered limited only by the following claims.

What is claimed is:

1. A method of making a rare earth-transition metal powder compact having a thin, curved shape, comprising:

compacting a quantity of rare earth-transition metal composition powder in a first press to a pack density of at least 50% of the theoretical density, said powder being substantially magnetically aligned by an applied magnetic field during said compacting, said powder being confined during said compacting in a thin, curved cavity defined between a mandrel shaped to define the inner curved surface of said compact and a die liner shaped to define the outer curved surface of said compact, the compacting force being applied in a direction parallel to the longitudinal axes of said curved inner and outer surfaces, transporting said powder from said first press to a second press, said powder being held substantially undisturbed in its compacted and magnetically aligned state between said mandrel and liner, said mandrel and liner protecting said powder during the transportation, thereafter further compacting said powder particles in said cavity in said second press by applying a compacting force in said longitudinal axial direction to a density sufficient to form a relatively strong and self-supporting green compact, said further compacting being accomplished without an applied magnetic field, the magnetic alignment of said powder in said compact not being substantially decreased thereby.

2. A method of making a rare earth-transition metal powder compact having a thin, curved shape, comprising:

introducing a quantity of a rare earth-transition metal composition powder into a thin, curved cavity defined between a mandrel shaped to define the inner curved surface of said compact and a die liner shaped to define the outer curved surface of said compact, compacting the powder in said cavity in a first press to a pack density of at least 50% of the theoretical density, said powder being subjected to and substantially magnetically aligned during said compacting by an applied magnetic field generated by magnetizing means positioned in the die block of said first press, the compacting force being applied in a direction parallel to the longitudinal axes of said curved inner and outer cavity surfaces, transporting said powder from said first press to a second press, said powder being held substantially undisturbed in its compacted and magnetically aligned state between said mandrel and liner, said mandrel and liner protecting said powder during the transportation, further compacting said powder in said cavity in said second press to a density of at least 60% of the theoretical, said further compacting being accomplished without an applied magnetic field, the magnetic alignment of said powder in said compact not being substantially decreased thereby.

3. A method of making a rare earth-transition metal powder compact having a thin, curved shape with a concave face and a convex face suitable for use in making a densified rare earth-transition metal permanent magnet comprising:

introducing a quantity of a rare earth-transition metal composition powder into a thin, curved cavity defined by a mandrel shaped to define the concave surface of said compact and a die liner shaped to define the convex surface of said compact, compacting the powder in said cavity in a first press to a density of at least 50% of the theoretical density, the compacting force being applied a direction parallel to the longitudinal axes of said convex and concave compact surfaces, said powder being subjected to and substantially radially magnetically aligned during said compacting by an applied magnetic field generated by magnetizing means positioned in the die block of said first press, transporting said powder from said first press to a second press, said powder being held substantially undisturbed in its compacted and magnetically aligned state between said mandrel and liner, said mandrel and liner protecting said powder during the transportation, further compacting said powder in said cavity in said second press to a density of at least 60% of the theoretical to form a relatively strong and self-supporting green compact, said further compacting being accomplished without an applied magnetic field, the magnetic alignment of said powder in said compact not being substantially decreased by the further compaction, and removing said compact from said tooling.

* * * * *